(12) United States Patent
Hsiao et al.

(10) Patent No.: US 11,494,941 B2
(45) Date of Patent: Nov. 8, 2022

(54) CALIBRATION SYSTEM FOR CALIBRATING VISUAL COORDINATE SYSTEM AND DEPTH COORDINATE SYSTEM, CALIBRATION METHOD AND CALIBRATION DEVICE

(71) Applicant: Coretronic Corporation, Hsin-Chu (TW)

(72) Inventors: Pei-Chi Hsiao, Hsin-Chu (TW); Huang-Cheng Chiang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 23 days.

(21) Appl. No.: 17/349,895

(22) Filed: Jun. 16, 2021

(65) Prior Publication Data
US 2021/0398319 A1    Dec. 23, 2021

(30) Foreign Application Priority Data
Jun. 22, 2020   (TW) .................... 109121082

(51) Int. Cl.
*G06T 7/80*   (2017.01)
*G06T 3/60*   (2006.01)
(Continued)

(52) U.S. Cl.
CPC ............ *G06T 7/80* (2017.01); *G06T 3/20* (2013.01); *G06T 3/60* (2013.01); *H04N 17/002* (2013.01);
(Continued)

(58) Field of Classification Search
CPC .... G06T 7/80; G06T 3/20; G06T 3/60; G06T 2207/10028; H04N 17/002; G01C 3/02; G01C 25/00
See application file for complete search history.

(56) References Cited

U.S. PATENT DOCUMENTS 10,531,004 B2    1/2020  Wheeler et al.
10,838,049 B1 *  11/2020 Schwiesow ........... G01S 7/4972
(Continued)

FOREIGN PATENT DOCUMENTS

CN    103049912    3/2015
CN    105205858   12/2015
(Continued)

OTHER PUBLICATIONS

Robots in Search, "Hokuyo 2d LiDARs", Retrieved on Jun. 2021, Available at: https://robotsinsearch.com.au/hokuyo-2d-lidars/#.
(Continued)

*Primary Examiner* — John R Schnurr
(74) *Attorney, Agent, or Firm* — JCIPRNET (57) ABSTRACT

The disclosure provides a calibration system, a calibration method, and a calibration device. The calibration method for obtaining a transformation of coordinate systems between a vision sensor and a depth sensor includes the following steps. (a) A first coordinate group of four endpoints of a calibration board in a world coordinate system is created. (b) An image of the calibration board is obtained by the vision sensor, and a second coordinate group of the four endpoints of the calibration board in a two-dimensional coordinate system is created. (c) A third coordinate group of the four endpoints of the calibration board in a three-dimensional coordinate system is created according to the first and second coordinate groups. (d) The third coordinate group is transformed to a fourth coordinate group corresponding to the depth sensor to obtain the transformation of the coordinate systems according to at least three target scanning spots.

21 Claims, 5 Drawing Sheets

(51) Int. Cl.
*G06T 3/20* (2006.01)
*H04N 17/00* (2006.01)
*G01C 25/00* (2006.01)
*G01C 3/02* (2006.01)

(52) U.S. Cl.
CPC .............. *G01C 3/02* (2013.01); *G01C 25/00* (2013.01); *G06T 2207/10028* (2013.01)

(56) References Cited

U.S. PATENT DOCUMENTS

| | | | |
|---|---|---|---|
| 2016/0227193 A1* | 8/2016 | Osterwood | B25J 9/1697 |
| 2019/0056484 A1* | 2/2019 | Bradley | G01S 7/4815 |
| 2019/0122386 A1* | 4/2019 | Wheeler | G01S 17/42 |
| 2020/0018852 A1* | 1/2020 | Walls | G06T 7/11 |
| 2020/0089971 A1* | 3/2020 | Li | G06T 7/12 |
| 2020/0098133 A1 | 3/2020 | Chen et al. | |
| 2020/0158840 A1* | 5/2020 | Ikram | G01S 13/867 |
| 2020/0301013 A1* | 9/2020 | Banerjee | G01S 13/867 |
| 2021/0004610 A1* | 1/2021 | Huang | G01S 17/931 |
| 2021/0051317 A1* | 2/2021 | Yan | G06T 7/80 |
| 2021/0192788 A1* | 6/2021 | Diederichs | G06K 9/6224 |
| 2021/0215505 A1* | 7/2021 | Castorena Martinez | G01C 25/005 |
| 2021/0407130 A1* | 12/2021 | Qian | G06V 20/588 |
| 2022/0055652 A1* | 2/2022 | Lee | G05D 1/02 |
| 2022/0155776 A1* | 5/2022 | Qian | G05D 1/0011 |

FOREIGN PATENT DOCUMENTS

| | | |
|---|---|---|
| TW | 201525415 | 7/2015 |
| TW | 201719120 | 6/2017 |
| TW | I607412 | 12/2017 |
| TW | 201817215 | 5/2018 |
| TW | I696804 | 6/2020 |
| WO | 2019203840 | 10/2019 |

OTHER PUBLICATIONS

Velodyne LiDAR, "Velodyne LiDAR", Retrieved on Jun. 2021, Available at: https://orfe.princeton.edu/~alaink/SmartDrivingCars/Presentations/ATI21LeadershipSummit010717/ATI21_VelodyneLiDAR.pdf.

Vladimir Koifman, "LiDAR News: Voyant Photonics, Aeye", Jul. 2019, Available at: http://image-sensors-world.blogspot.com/2019/07/lidar-news-voyant-photonics-aeye.html.

Microsoft., "Kinect for Windows", Retrieved on Jun. 2021, Available at: https://developer.microsoft.com/en-us/windows/kinect/.

Keegan Garcia et al., "Robust traffic and intersection monitoring using millimeter wave sensors", Texas Instruments, May 2018, pp. 1-13.

Vincent Lepetit et al., "EPnP: An Accurate O(n) Solution to the PnP Problem", International Journal of Computer Vision, vol. 81, Issue 2, Feb. 2009, pp. 155-166.

Qilong Zhang et al., "Extrinsic calibration of a camera and laser range finder (improves camera calibration)", 2004 IEEE/RSJ International Conference on Intelligent Robots and Systems (IROS) (IEEE Cat. No. 04CH37566), Sep. 28-Oct. 2, 2004, pp. 1-6.

Lipu Zhou et al., "Automatic Extrinsic Calibration of a Camera and a 3D LiDAR Using Line and Plane Correspondences", 2018 IEEE/RSJ International Conference on Intelligent Robots and Systems (IROS), Oct. 2018, pp. 1-8.

Zoltán Pusztai et al., "Accurate calibration of multi-lidar-multi-camera systems", Sensors, vol. 18, Issue 2139, Jul. 2018, pp. 1-22.

Sergio Alberto Rodriguez Florez, et al., "Extrinsic calibration between a multi-layer lidar and a camera", IEEE International Conference on Multisensor Fusion and Integration for Intelligent Systems, Aug. 2008, pp. 1-7.

Martin Velas et al., "Calibration of rgb camera with velodyne lidar", Journal of WSCG, vol. 2014, 2014, pp. 1-10.

Gaurav Pandey et al., "Automatic extrinsic calibration of vision and lidar by maximizing mutual information", Journal of Field Robotics, vol. 32, Issue 5, Sep. 2014, pp. 1-33.

Richard O. Duda et al., "Use of the Hough Transformation to Detect Lines and Curves in Pictures", Graphics and Image Processing, vol. 15, Issue 1, Jan. 1972, pp. 11-15.

Wikipedia, "Heron's formula", Retrieved on Jun. 2021, Available at: https://en.wikipedia.org/wiki/Heron%27s_formula.

Wikipedia, "Rodrigues' rotation formula", Retrieved on Jun. 2021, Available at: https://en.wikipedia.org/wiki/Rodrigues%27_rotation_formula.

"Office Action of Taiwan Counterpart Application", dated Jun. 25, 2021, p. 1-p. 3.

* cited by examiner

CALIBRATION SYSTEM FOR CALIBRATING VISUAL COORDINATE SYSTEM AND DEPTH COORDINATE SYSTEM, CALIBRATION METHOD AND CALIBRATION DEVICE

CROSS-REFERENCE TO RELATED APPLICATION

This application claims the priority benefit of Taiwan application serial no. 109121082, filed on Jun. 22, 2020. The entirety of the above-mentioned patent application is hereby incorporated by reference herein and made a part of this specification.

BACKGROUND

Technical Field

The disclosure relates to image calibration technology, and in particular, to a calibration system for calibrating a visual coordinate system and a depth coordinate system, a calibration method, and a calibration device configured for the transformation of coordinate systems between a vision sensor and a depth sensor.

Description of Related Art

Nowadays, self-driving technologies applied in self-driving cars are booming. Therefore, vision sensors and depth sensors are widely applied to replace the human perception, recognition, and positioning with respect to the environment in driving. Common vision sensors are, for example, color cameras, monochrome cameras, and near-infrared cameras. The vision sensor exhibits low cost and resemblance to human vision, so it is well adapted to object recognition. However, the vision sensor is easily affected by the environment and the light source, leading to an unstable detection distance. Common depth sensors adopt ranging technologies such as structured light, time of flight (ToF), light detection and ranging (LiDAR, i.e., light radar or laser radar), millimeter wave radar, and other ranging technologies. Compared to the vision sensor, the depth sensor is less susceptible to the effect of weather, environment, and light source. Therefore, the depth sensor can collect stable depth information and has advantages in simultaneous localization and mapping (SLAM), real-time obstacle avoidance, and three-dimensional object recognition. However, the cost of the depth sensor is relatively high. Accordingly, the vision sensor and the depth sensor are applied at the same time to complement each other in the practical application.

Based on the above, in the practical application of the vision sensor and the depth sensor, the vision sensor and the depth sensor both form coordinate systems based on their respective origins. Therefore, to integrate the vision sensor and the depth sensor, it is necessary to calibrate the relationship between the two coordinate systems, that is, to obtain a transformation of coordinate system in which the vision sensor coordinate system is transformed to the depth sensor coordinate system or the depth sensor coordinate system is transformed to the vision sensor coordinate system. The transformation of coordinate systems, also called an extrinsic parameters, includes rotation and translation.

In order to accurately obtain the transformation between the vision sensor coordinate system and the depth sensor coordinate system, methods for calibrating the extrinsic parameters have been proposed. Conventional and current methods can be roughly categorized into methods using a target object and methods not using a target object.

In the case of the methods using a target object, a checkerboard calibration board, for example, may be used to calibrate the extrinsic parameters between the single-line laser radar and the vision sensor (e.g., a camera). The normal vectors of the checkerboard calibration board in a visual coordinate system (camera coordinate system) is calculated through the checkerboard calibration board. The normal vectors and the laser points incident on the checkerboard calibration board form geometric constraints which may be used as extrinsic parameters, and then the extrinsic parameters are solved by collecting the postures of multiple checkerboard calibration boards. The above posture may include, for example, a position and a pose of the checkerboard calibration board. In addition, in other methods, different target objects, such as boxes, round holes, or trihedrons, are used for calibration. However, there are still many limitations in the practical application of the methods using specific target objects. That is, the target object itself should be easily recognized by the vision sensor, and the range of the target object itself must be large enough and well placed for both the vision sensor and the depth sensor to detect. Moreover, the target object should be easily manufactured; otherwise, it is difficult to apply the methods using such target objects.

In the case of the methods not using a target object, for example, without relying on any scene or target object, only by using mutual information between the intensity of a radar echo and the grayscale of a camera image, the extrinsic parameters between the vision sensor and the depth sensor are continuously optimized starting from the initial value of the extrinsic parameters. However, there is a blind spot in the implementation of the method, so the initial value of the extrinsic parameters may greatly affect the final result and it is not easy to estimate the initial value of the extrinsic parameters. In addition, with the inconsistency in the standard used in shooting the scene for calibration, the intensity of radar echo of different object materials is different and has no absolute relationship with the grayscale in the vision sensor, so the calibration may eventually fail to converge.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

In view of this, the disclosure provides a calibration method, a calibration device, and a calibration system for calibrating a visual coordinate system and a depth coordinate system, which can be used to solve the above problems.

The disclosure provides a calibration method for obtaining a transformation of coordinate systems between a vision sensor and a depth sensor. The calibration method includes the following steps. (a) A first coordinate group of four endpoints of a calibration board in a world coordinate system is created. (b) An image of the calibration board is obtained by the vision sensor and a second coordinate group of the four endpoints of the calibration board in a two-dimensional coordinate system is created. (c) A third coordinate group of the four endpoints of the calibration board corresponding to the vision sensor in a three-dimensional coordinate system is created according to the first coordinate group and the second coordinate group. (d) The third coordinate group is transformed to a fourth coordinate group corresponding to the depth sensor to obtain the transformation of the coordinate system according to at least three target scanning spots generated by the depth sensor.

In an embodiment of the disclosure, after the step of creating the second coordinate group of the four endpoints of the calibration board in the two-dimensional coordinate system, the calibration method further includes the following step. A first transformation between the first coordinate group and the second coordinate group is obtained according to a geometric correspondence between the first coordinate group and the second coordinate group and an intrinsic parameter of the vision sensor. The step of creating the third coordinate group of the four endpoints of the calibration board in the three-dimensional coordinate system according to the first coordinate group and the second coordinate group includes the following step. The first coordinate group is transformed to the third coordinate group according to the first transformation.

In an embodiment of the disclosure, the step of transforming the third coordinate group to the fourth coordinate group corresponding to the depth sensor includes the following step. The third coordinate group is transformed to the fourth coordinate group according to a second transformation. The second transformation is a correspondence between a coordinate system of the vision sensor and a coordinate system of the depth sensor.

In an embodiment of the disclosure, the at least three target scanning spots are located in a quadrilateral formed by the four endpoints in the fourth coordinate group.

In an embodiment of the disclosure, the step of transforming the third coordinate group to the fourth coordinate group corresponding to the depth sensor to obtain the transformation of coordinate systems according to the at least three target scanning spots generated by the depth sensor includes the following steps. A sum of areas of four triangles formed by scanning spots generated by the depth sensor and the four endpoints in the fourth coordinate group is calculated. The second transformation is solved by taking, as the target scanning spots, scanning spots of which a difference between the sum of the areas of the four triangles and an area of the quadrilateral is less than an error value.

In an embodiment of the disclosure, the calibration board is a flat plate, a posture of the calibration board is within a visible range of the vision sensor and the depth sensor, and the calibration method further includes the following steps. (e) Another posture of the calibration board is obtained and it is determined whether a posture count value is greater than or equal to a target value. If the posture count value is greater than or equal to the target value, step (f) is performed, and if the posture count value is less than the target value, the posture count value is counted, and step (a) is re-performed on the calibration board with the another posture. (f) The transformation of coordinate systems is solved with a plurality of target scanning spots corresponding to postures in a quantity of the target value.

In an embodiment of the disclosure, the transformation of coordinate systems includes a correspondence, a rotation angle, and a translation between a coordinate system of the vision sensor and a coordinate system of the depth sensor.

The disclosure provides a calibration system for calibrating a visual coordinate system and a depth coordinate system. The calibration system includes a vision sensor, a depth sensor, and a processor. The vision sensor is configured to obtain an image of a calibration board, the depth sensor is configured to generate a plurality of scanning spots, and the processor is coupled to the vision sensor and the depth sensor to obtain a transformation of coordinate system between the vision sensor and the depth sensor. The processor is configured to (a) create a first coordinate group of four endpoints of the calibration board in a world coordinate system; (b) create a second coordinate group of the four endpoints of the calibration board in a two-dimensional coordinate system according to the image of the calibration board; (c) create a third coordinate group of the four endpoints of the calibration board corresponding to the vision sensor in a three-dimensional coordinate system according to the first coordinate group and the second coordinate group; and (d) transform the third coordinate group to a fourth coordinate group corresponding to the depth sensor to obtain the transformation of coordinate systems according to at least three target scanning spots.

In an embodiment of the disclosure, after the operation of creating the second coordinate group of the four endpoints of the calibration board in the two-dimensional coordinate system, the processor is configured to obtain a first transformation between the first coordinate group and the second coordinate group according to a geometric correspondence between the first coordinate group and the second coordinate group and an intrinsic parameter of the vision sensor. In the operation of creating the third coordinate group of the four endpoints of the calibration board in the three-dimensional coordinate system according to the first coordinate group and the second coordinate group, the processor is configured to transform the first coordinate group to the third coordinate group according to the first transformation.

In an embodiment of the disclosure, in the operation of transforming the third coordinate group to the fourth coordinate group corresponding to the depth sensor, the processor is configured to transform the third coordinate group to the fourth coordinate group according to a second transformation. The second transformation is a correspondence between a coordinate system of the vision sensor and a coordinate system of the depth sensor.

In an embodiment of the disclosure, the at least three target scanning spots are located in a quadrilateral formed by the four endpoints in the fourth coordinate group.

In an embodiment of the disclosure, in the operation of transforming the third coordinate group to the fourth coordinate group corresponding to the depth sensor to obtain the transformation of coordinate systems according to the at least three target scanning spots generated by the depth senor on the calibration board, the processor is configured to calculate a sum of areas of four triangles formed by the scanning spots and the four endpoints in the fourth coordinate group and to solve the second transformation by taking, as the target scanning spots, scanning spots of which a difference between the sum of the areas of the four triangles and an area of the quadrilateral is less than an error value.

In an embodiment of the disclosure, the calibration board is a flat plate, and a posture of the calibration board is within a visible range of the vision sensor and the depth sensor. The processor is further configured to (e) obtain another posture of the calibration board and determine whether a posture count value is greater than or equal to a target value. If the posture count value is greater than or equal to the target value, operation (f) is performed, and if the posture count value is less than the target value, the posture count value is counted, and operation (a) is re-performed on the calibration board with the another posture. The processor is configured to (f) solve the transformation of coordinate systems with a plurality of target scanning spots corresponding to postures in a quantity of the target value.

In an embodiment of the disclosure, the transformation of coordinate systems includes a correspondence, a rotation angle, and a translation between a coordinate system of the vision sensor and a coordinate system of the depth sensor.

The disclosure provides a calibration device including a storage circuit and a processor. The storage circuit stores images of a calibration board obtained by a vision sensor and stores a plurality of scanning spots generated by a depth sensor on the calibration board. The processor is coupled to the storage circuit and accesses the images and the scanning spots to (a) create a first coordinate group of four endpoints of the calibration board in a world coordinate system; (b) create a second coordinate group of the four endpoints of the calibration board in a two-dimensional coordinate system according to the images of the calibration board; (c) create a third coordinate group of the four endpoints of the calibration board corresponding to the vision sensor in a three-dimensional coordinate system according to the first coordinate group and the second coordinate group; and (d) transform the third coordinate group to a fourth coordinate group corresponding to a depth sensor to obtain a transformation of coordinate system according to at least three target scanning spots.

In an embodiment of the disclosure, after the operation of creating the second coordinate group of the four endpoints of the calibration board in the two-dimensional coordinate system, the processor is configured to obtain a first transformation between the first coordinate group and the second coordinate group according to a geometric correspondence between the first coordinate group and the second coordinate group and an intrinsic parameter of the vision sensor. In the operation of creating the third coordinate group of the four endpoints of the calibration board in the three-dimensional coordinate system according to the first coordinate group and the second coordinate group, the processor is configured to transform the first coordinate group to the third coordinate group according to the first transformation.

In an embodiment of the disclosure, in the operation of transforming the third coordinate group to the fourth coordinate group corresponding to the depth sensor, the processor is configured to transform the third coordinate group to the fourth coordinate group according to a second transformation. The second transformation is a correspondence between a coordinate system of the vision sensor and a coordinate system of the depth sensor.

In an embodiment of the disclosure, the at least three target scanning spots are located in a quadrilateral formed by the four endpoints in the fourth coordinate group.

In an embodiment of the disclosure, in the operation of transforming the third coordinate group to the fourth coordinate group corresponding to the depth sensor to obtain the transformation of coordinate systems according to the at least three target scanning spots generated by the depth sensor on the calibration board, the processor is configured to calculate a sum of areas of four triangles formed by the target scanning spots and the four endpoints in the fourth coordinate group and to solve the second transformation by taking, as the target scanning spots, scanning spots of which a difference between the sum of the areas of the four triangles and the area of the quadrilateral is less than an error value.

In an embodiment of the disclosure, the calibration board is a flat plate, and a posture of the calibration board is within a visible range of the vision sensor and the depth sensor. The processor is further configured to (e) obtain another posture of the calibration board and determine whether a posture count value is greater than or equal to a target value. If the posture count value is greater than or equal to the target value, operation (f) is performed, and if the posture count value is less than the target value, the posture count value is counted, and operation (a) is re-performed on the calibration board with the another posture. The processor is configured to (f) solve the transformation of coordinate systems with a plurality of target scanning spots corresponding to postures in a quantity of the target value.

In an embodiment of the disclosure, the transformation of coordinate systems includes a correspondence, a rotation angle, and a translation between a coordinate system of the vision sensor and a coordinate system of the depth sensor.

Based on the above, the disclosure proposes a calibration method using a flat plate as the calibration target, and the accuracy of the obtained transformation of coordinate system between the vision sensor and the depth sensor is ensured by the constraining area formed by the scanning spots generated by the depth sensor on the calibration board. Therefore, the calibration method improves the stability of the calibration results of the transformation of coordinate systems. Also, the calibration method is not limited to the use of specific objects such as checkerboard calibration boards and can be widely applied to calibrate a transformation of coordinate system between various depth sensors and vision sensors.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
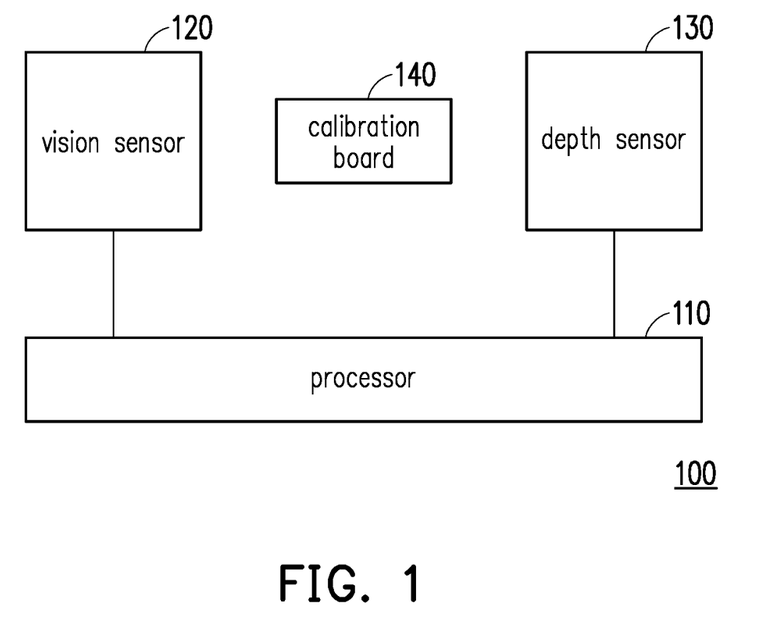
FIG. 1 is a block diagram illustrating a calibration system for calibrating a visual coordinate system and a depth coordinate system according to an embodiment of the disclosure.
Figure 2:
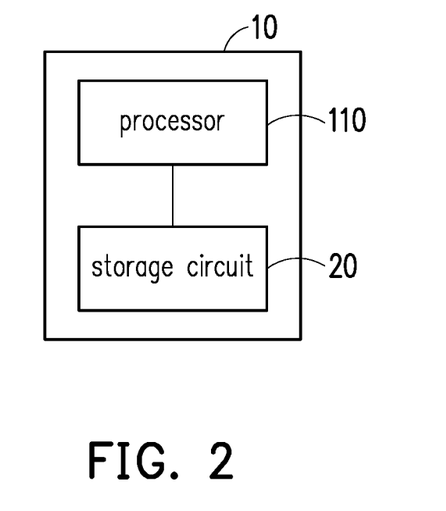
FIG. 2 is a block diagram illustrating a calibration device according to an embodiment of the disclosure.

FIG. 1 is a block diagram illustrating a calibration system for calibrating a visual coordinate system and a depth coordinate system according to an embodiment of the disclosure. FIG. 2 is a block diagram illustrating a calibration device according to an embodiment of the disclosure. Note that the embodiments in FIG. 1 and FIG. 2 are only for convenience of description and are not intended to limit the disclosure.

Referring to FIG. 1, a calibration system 100 for calibrating a visual coordinate system and a depth coordinate system includes a processor 110, a vision sensor 120, a depth sensor 130, and a calibration board 140. The processor 110 is coupled to the vision sensor 120 and the depth sensor 130, and the calibration board 140 is disposed within sensing ranges of the vision sensor 120 and the depth sensor 130. In particular, the calibration board 140 is a flat plate in the embodiment of the disclosure. In the embodiment, the calibration system 100 for calibrating a visual coordinate system and a depth coordinate system may be disposed in any scene such as an indoor environment, an outdoor environment, etc. so as to obtain a transformation of coordinate systems between the vision sensor 120 and the depth sensor 130.

The processor 110 is coupled to the vision sensor 120 and the depth sensor 130 in a wireless manner or in a wired manner. In addition, the processor 110 is configured to obtain the transformation of coordinate systems between the vision sensor 120 and the depth sensor 130. In the present embodiment, the processor 110 may be a general-purpose processor, a special-purpose processor, a conventional processor, a digital signal processor, multiple microprocessors, one or more microprocessors integrated with a digital signal processor core, a controller, a microcontroller, an application specific integrated circuit (ASIC), a field programmable gate array (FPGA), any other kind of integrated circuit, a state machine, a processor based on advanced reduced instruction set machine (ARM), and the like. In the embodiment, the processor 110 is configured to perform a calibration method of the disclosure to obtain the transformation of coordinate systems between the vision sensor 120 and the depth sensor 130.

The vision sensor 120 is configured to obtain an image of the calibration board 140 and has an image capturing unit with a lens and a photosensitive element. The photosensitive element is configured to sense the intensity of light passing through the lens to generate images. The photosensitive element may be, for example, a charge coupled device (CCD) element, a complementary metal-oxide semiconductor (CMOS) element, or other elements, and the disclosure is not limited thereto. For example, the vision sensor 120 may be a camera such as a color camera, a monochrome camera, a near infrared camera, or the like.

The depth sensor 130 is configured to generate a plurality of scanning spots to detect depth information in front of it. The depth sensor 130 is capable of calculating the depth information in front by actively emitting light beams, ultrasound, lasers, etc. as signals. For example, the depth sensor 130 is capable of detecting the depth information with ranging technologies, such as structured light, time-of-flight ranging, optical radar, and millimeter-wave radar. However, the ranging method used by the depth sensor 130 is not limited in the disclosure, and depth sensors based on single-line laser radars, multi-line laser radars, dynamic laser points, area depth images, etc. may be applied to the calibration system 100 for calibrating a visual coordinate system and a depth coordinate system in the embodiment.

In an embodiment of the disclosure, the processor 110 of the calibration system 100 for calibrating a visual coordinate system and a depth coordinate system may be implemented as a calibration device having a computation processing function, but the disclosure is not limited thereto. Specifically, referring to FIG. 2, in different embodiments, a calibration device 10 may be a smartphone, a tablet computer, a personal computer, a laptop computer, or other devices with computation processing functions, but the disclosure is not limited thereto. As shown in FIG. 2, the calibration device 10 may include the processor 110 and a storage circuit 20. The processor 110 is coupled to the storage circuit 20. The storage circuit 20 is, for example, any type of fixed or removable random access memory (RAM), read-only memory (ROM), flash memory, hard disk, other similar devices, or a combination thereof.

In the embodiments of the disclosure, the calibration device 10 may be applied to the calibration system 100 for calibrating a visual coordinate system and a depth coordinate system in any scene. The storage circuit 20 of the calibration device 10 is configured to store the image of the calibration board 140 obtained by the vision sensor 120 and store the plurality of scanning spots generated by the depth sensor 130 on the calibration board 140. The processor 110 is capable of accessing the image and the scanning spots recorded in the storage circuit 20 and performing the calibration method proposed by the disclosure. The details of the calibration method are as follows.

Figure 3:
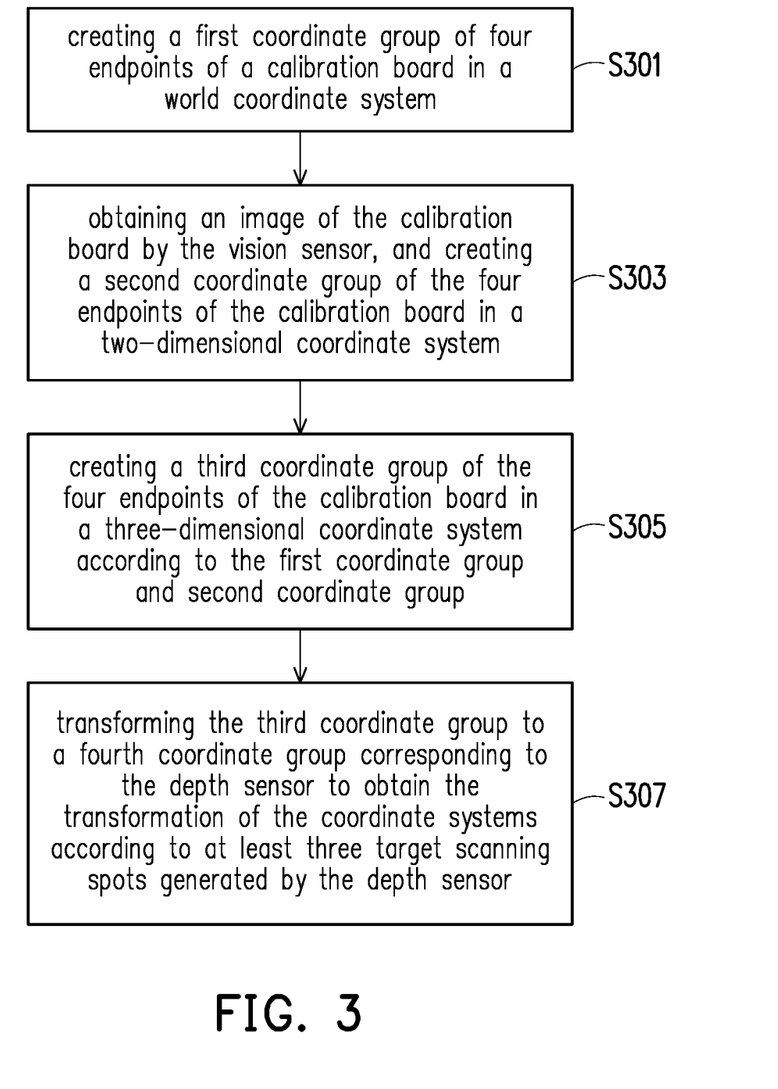
FIG. 3 is a flowchart illustrating a calibration method according to an embodiment of the disclosure.
Figure 4:
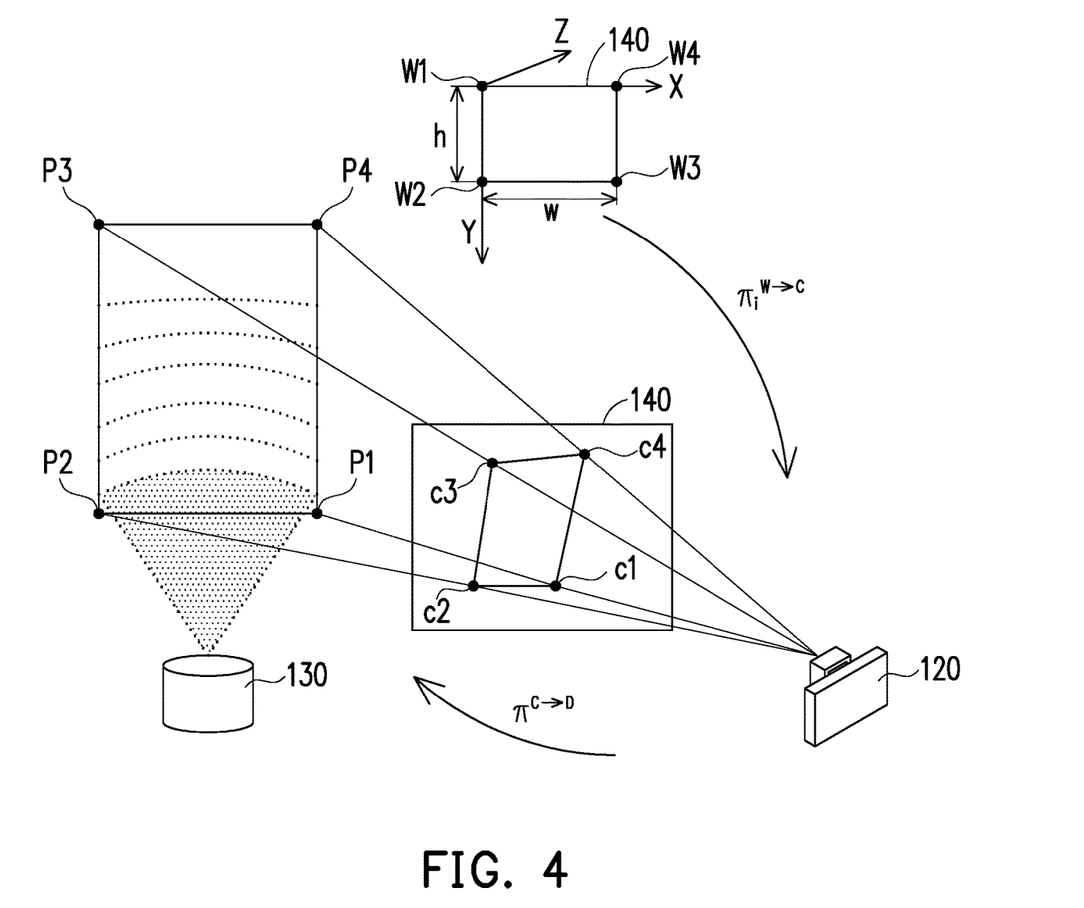
FIG. 4 is a schematic view illustrating a transformation of coordinate system in a calibration system for calibrating a visual coordinate system and a depth coordinate system according to an embodiment of the disclosure.

Referring to FIG. 3 and FIG. 4, FIG. 3 is a flowchart illustrating a calibration method according to an embodiment of the disclosure, and FIG. 4 is a schematic view illustrating a transformation of coordinate system in a calibration system for calibrating a visual coordinate system and a depth coordinate system according to an embodiment of the disclosure. The calibration method of the embodiment may be performed by the processor 110 of the calibration device 10 in FIG. 1 and FIG. 2. With reference to the elements shown in FIG. 1 and the schematic view illustrating the transformation of coordinate systems of FIG. 4, the details of each step in FIG. 3 are described below.

First, before step S301, as shown in FIG. 4, the calibration board 140 is disposed between the vision sensor 120 and the depth sensor 130, so that a posture of the calibration board 140 is within a visible range (i.e., within the sensing range) of the vision sensor 120 and the depth sensor 130. Herein, the posture may include, for example, a position and a pose of the calibration board 140. Note that in the embodiment of the disclosure, the transformation of coordinate systems (i.e., extrinsic parameters) between the vision sensor 120 and the depth sensor 130 to be obtained includes a correspondence, a rotation angle, and a translation between the coordinate system of the vision sensor 120 and the coordinate system of the depth sensor 130. More specifically, an object has six degrees of freedom in space. The six degrees of freedom in space are the degrees of freedom of movement (i.e., the translation) along the three orthogonal coordinate axes of X, Y, and Z and the degrees of freedom of rotation (i.e., the rotation angle) around the three coordinate axes. Therefore, by obtaining the six degrees of freedom, the position of the object can be determined.

In step S301, the processor 110 creates a first coordinate group of four endpoints of the calibration board 140 in a world coordinate system (WCS). Specifically, the world coordinate system is a fixed coordinate system. The world coordinate system takes the world space or a model space as a whole and can be defined by the X-axis, Y-axis, and Z-axis. For example, a plane of the calibration board 140 in FIG. 4 coincides with the X-Y plane, and it is assumed that a length of the calibration board 140 is h and a width of the calibration board 140 is w. Therefore, in step S301, by measuring the actual physical dimensions of the calibration board 140, a coordinate W1[0,0,0], a coordinate W2[0,h,0], a coordinate W3[w,h,0], and a coordinate W4[w,0,0] of the four endpoints of the calibration board 140 in the world coordinate system are obtained, and the four coordinates in the world coordinate system are the first coordinate group.

Next, in step S303, the processor 110 uses the image of the calibration board 140 obtained by the vision sensor 120 to create a second coordinate group of the four endpoints of the calibration board 140 in a two-dimensional coordinate system according to the image of the calibration board 140. For example, the Hough Transformation is used herein to identify the features of the calibration board 140 in the image. For example, the straight line features of the edges of the calibration board 140 are identified, and the intersection points of each two lines are the four endpoints of the calibration board 140. Thus, a coordinate c1, a coordinate c2, a coordinate c3, and a coordinate c4 in a two-dimensional coordinate system according to the image of the four endpoints of the calibration board 140 are detected. The four coordinates in the two-dimensional coordinate system are the second coordinate group.

After step S303, the processor 110 obtains a first transformation between the first coordinate group and the second coordinate group according to a geometric correspondence between the first coordinate group and the second coordinate group and the intrinsic parameter of the vision sensor 120. In the embodiment, the geometric correspondence is a PnP (perspective-n-point) transformation method for solving a transformation between a three-dimensional coordinate point and a two-dimensional coordinate point, and the intrinsic parameter of the vision sensor 120 is, for example, focal length information including information such as the focal length of the lens and the center position of the lens. For example, the intrinsic parameter matrix of the vision sensor 120 with a lens focal length (fx, fy) and a lens center position (cy, cx) is K=[fx, 0, cx; 0, fy, cy; 0, 0, 1]. Moreover, the intrinsic parameters and the intrinsic parameter matrix can be obtained through a calibration procedure for calibrating lens distortion or deformation before step S301. The first coordinate group in the world coordinate system and the second coordinate group in the two-dimensional coordinate system conform to the geometric correspondence of the PnP transformation method for 3D-2D correspondence matching. Therefore, by substituting the intrinsic parameter matrix K into the PnP transformation method, the transformation $\pi_i^{W \to C}$ (i.e., the first transformation $\pi_i^{W \to C}$) shown in FIG. 4 can be obtained. The index value i is a positive integer greater than 0 and represents the posture of the i-th calibration board 140 used in the calibration method. W→C represents the transformation from the world coordinate system to the visual coordinate system (camera coordinate system).

In step S305, the processor 110 creates a third coordinate group of the four endpoints of the calibration board 140 corresponding to the vision sensor 120 in the three-dimensional coordinate system according to the first coordinate group and the second coordinate group. In the step, the processor 110 transforms the coordinate W1[0,0,0], the coordinate W2[0,h,0], the coordinate W3[w,h,0], and the coordinate W4[w,0,0] of the first coordinate group in the world coordinate system to a coordinate C1i, a coordinate C2i, a coordinate C3i, and a coordinate C4i (not shown) in the three-dimensional coordinate system, respectively, according to the first transformation $\pi_i^{W \to C}$. The four coordinates in the three-dimensional coordinate system are the third coordinate group corresponding to the vision sensor 120.

In step S307, the processor 110 transforms the third coordinate group of the vision sensor to a fourth coordinate group corresponding to the depth sensor 130. The processor 110 calculates the transformation of coordinate systems between the vision sensor 120 and the depth sensor 130 according to at least three target scanning spots. Specifically, the processor 110 transforms the third coordinate group to the fourth coordinate group according to a transformation $\pi^{C \to D}$ (i.e., a second transformation $\pi^{C \to D}$). C→D represents the transformation from the visual coordinate system to the depth coordinate system. That is, the coordinate C1i, the coordinate C2i, the coordinate C3i, and the coordinate C4i in the three-dimensional coordinate system are transformed to a coordinate P1i, a coordinate P2i, a coordinate P3i, and a coordinate P4i corresponding to the coordinate systems of the depth sensor (i.e., a coordinate P1, a coordinate P2, a coordinate P3, and a coordinate P4 as shown in FIG. 4). Similarly, the index value i is the posture of the i-th calibration board 140 used in the calibration method. The four coordinates in the coordinate system of the depth sensor are the fourth coordinate group. In particular, the second transformation $\pi^{C \to D}$ is the correspondence between the coordinate system of the vision sensor and the coordinate system of the depth sensor. Therefore, the transformation $\pi^{C \to D}$ is the transformation of coordinate systems to be obtained by the calibration method of the disclosure.

Figure 5A:
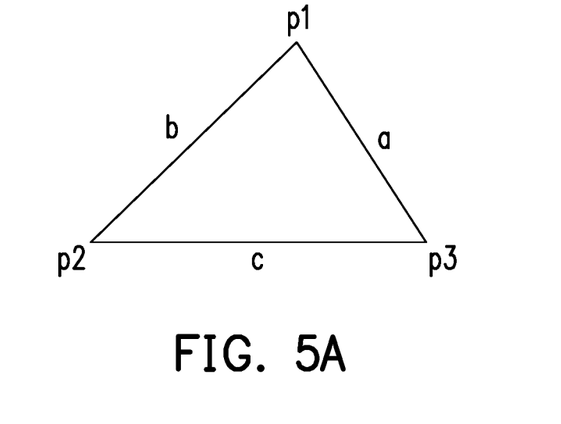
FIGS. 5A-5C are schematic views illustrating a method for obtaining a target scanning spot according to an embodiment of the disclosure.
Figure 5B:
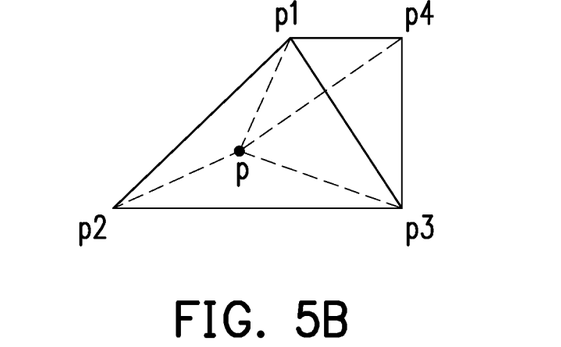
Figure 5C:
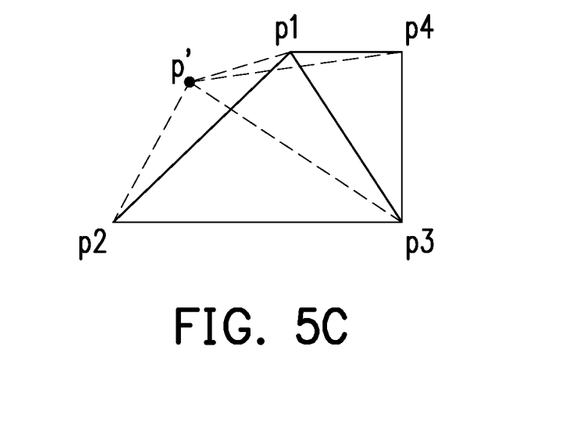

Furthermore, in step S307 of obtaining the transformation of the coordinate systems between the vision sensor 120 and the depth sensor 130 according to the fourth coordinate group and the at least three target scanning spots of the depth sensor 130 on the calibration board 140, the method for obtaining the target scanning spots is illustrated with reference to FIG. 5A to FIG. 5C. FIG. 5A to FIG. 5C are schematic views illustrating the method for obtaining a target scanning spot according to an embodiment of the disclosure.

Specifically, the depth sensor 130 generates a plurality of scanning spots Pi(j), j=1, . . . , Ni in the calibration system 100 for calibrating a visual coordinate system and a depth coordinate system. N represents the count of scanning spots generated by the depth sensor 130, and the index value i represents the posture of the i-th calibration board used in the calibration method. The processor 110 calculates the second transformation (i.e., the transformation of coordinate systems) and ensures that the target scanning spots falling on the calibration board 140 falls within a quadrilateral formed by the four endpoints of the calibration board 140. In the embodiment of the disclosure, the scanning spots and the four endpoints of the calibration board 140 are used to form a constraining area. The constraint condition of the constraining area is that an area enclosed by the four endpoints of the calibration board 140 must equal to a sum of areas of the four triangles formed by any scanning spot Pi (j) and the four endpoints.

More specifically, referring to FIG. 5A, to quickly obtain the area enclosed by the four endpoints of the calibration board 140, in the embodiment of the disclosure, the quadrilateral formed by the four endpoints of the calibration board 140 is regarded as two triangles, and the areas of two triangles are obtained, respectively. As shown in FIG. 5A, the area of a triangle with three endpoints p1, p2, and p3 and side lengths a, b, and c can be quickly obtained through the following Heron's formula (1).

$$A(p1,p2,p3)=(s(s-a)(s-b)(s-c))^{1/2}, s=(a+b+c)/2 \qquad \text{Formula (1)}$$

Next, referring to FIG. 5B and FIG. 5C, the area of the quadrilateral formed by the four endpoints p1, p2, p3, and p4 in FIG. 5B and FIG. 5C can be obtained by calculating the sum of the areas of the two triangles (that is, obtained by Formula (1) above) and expressed as A(p1, p2, p3)+A(p1, p3, p4). In the case of FIG. 5B, if any point p falls within the quadrilateral formed by the four endpoints p1, p2, p3, and p4, then as shown in Formula (2), the area of the quadrilateral formed by the four endpoints p1, p2, p3, and p4 is equal to the sum of the areas of the four triangles formed by the point p and the endpoints p1, p2, p3, and p4, respectively.

$$A(p1,p2,p3)+A(p1,p3,p4)=A(p1,p2,p)+A(p2,p3,p)+A(p3,p4,p)+A(p1,p4,p) \quad \text{Formula (2)}$$

In addition, in the case of FIG. 5C, if any point p' falls outside the quadrilateral formed by the four endpoints p1, p2, p3, and p4, the sum of the areas of the four triangles formed by the point p' and the endpoints p1, p2, p3, and p4 is greater than the area of the quadrilateral formed by the four endpoints p1, p2, p3, and p4 as shown in Formula (3).

$$A(p1,p2,p3)+A(p1,p3,p4)<A(p1,p2,p')+A(p2,p3,p')+A(p3,p4,p')+A(p1,p4,p') \quad \text{Formula (3)}$$

Based on the method for obtaining the target scanning spot, in the embodiment of the disclosure, as shown in FIG. 4, the area of the quadrilateral formed by the four endpoints of the calibration board 140 obtained by the processor 110 is expressed as A(p1, p2, p3)+A(p1, p2, p4). The sum of the areas of the four triangles respectively formed by any point P (not shown) and the four endpoints of the quadrilateral is expressed as A(p1, p2, p)+A(p2, P3, P)+A(P3, P4, P)+A(P1, P4, P), and the following target Formula (4) can be defined.

$$\text{Cover}(P1,P2,P3,P4,P)=\{[A(P1,P2,P3)+A(P1,P2,P4)]-[A(P1,P2,P)+A(P2,P3,P)+A(P3,P4,P)+A(P1,P4,P)]\}^2 \quad \text{Formula (4)}$$

Taking the presence of noise in the vision sensor and the depth sensor into consideration, the second transformation (i.e., the transformation of coordinate systems) to be obtained by the processor 110 is configured so that a difference between the sum of the areas of the four triangles formed by the target scanning spot and the four endpoints and the area of the quadrilateral is less than an error value. In other words, the area difference between the two areas (i.e., A(P1, P2, P3)+A(P1, P3, P4) and A(P1, P2, P)+A(P2, P3, P)+A(P3, P4, P)+A(P1, P4, P)) is favorably as small as possible, and that is, the value of Cover (P1, P2, P3, P4, P) is favorably as small as possible. Note that in the embodiment of the disclosure which uses a plurality of calibration boards for calibration, the target formula is also expressed as Cover (P1i, P2i, P3i, P4i, Pi(j)), and the index value i represents the posture of the i-th calibration board used in the calibration method.

Note that the constraint of the method for obtaining target scanning spots with the constraining area in the disclosure is stronger than the constraint of the conventional method between laser points falling on the calibration board and the normal vectors on the calibration board, so it is possible to ensure that the obtained scanning spot falls within the quadrilateral formed by the calibration board 140. Also, the method of the disclosure is not limited to the form of scanning spots. Accordingly, the method of the disclosure can be widely applied to depth sensors such as single-line laser radars, multi-line laser radars, dynamic laser points, area depth images, and the like.

Referring to step S307 in FIG. 3, after the processor 110 obtains at least three target scanning spots, the second transformation (i.e., the transformation of coordinate systems) between the vision sensor 120 and the depth sensor 130 is obtained according to the four endpoints (i.e., the coordinate W1[0,0,0], the coordinate W2[0,h,0], the coordinate W3[w,h,0], and the coordinate W4[w,0,0]) in the first coordinate group obtained in step S301 to step S305, the first transformation $\pi_i^{W \to C}$, and the at least three target scanning spots Pi(j). Based on the above, in the embodiment of the disclosure, first the processor 110 transforms the third coordinate group corresponding to the vision sensor 120 to the fourth coordinate group corresponding to the depth sensor 130 based on an unknown second transformation, then the at least three target scanning spots are obtained through the constraining area formed by the scanning spot and the fourth coordinate group, and according to the at least three target scanning spots, at least three formulas are listed to solve the second transformation to obtain the transformation of coordinate systems between the vision sensor 120 and the depth sensor 130.

Figure 6:
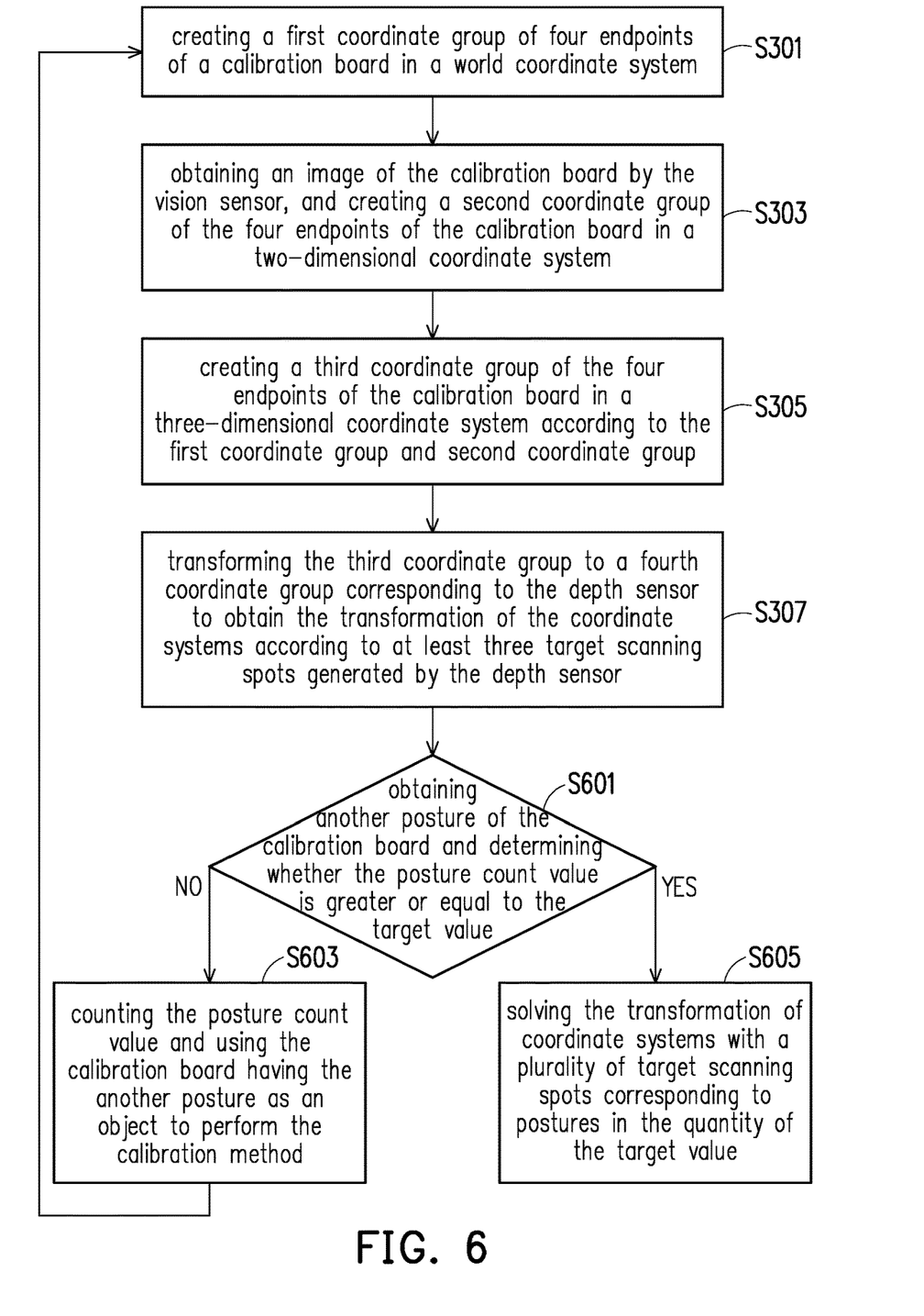
FIG. 6 is a flowchart illustrating a calibration method according to another embodiment of the disclosure.

In particular, in the embodiment of the disclosure, to improve the accuracy of the transformation of coordinate systems between the vision sensor 120 and the depth sensor 130, step S301 to step S307 of the calibration method in FIG. 3 are performed on a plurality of calibration boards with different postures to obtain an optimal solution to the extrinsic parameters. FIG. 6 is a flowchart illustrating a calibration method according to another embodiment of the disclosure. The steps of performing the calibration method of the disclosure on a plurality of calibration boards are described below with reference to FIG. 6.

Referring to FIG. 6, step S301 to step S307 in FIG. 6 are the same as step S301 to step S307 in FIG. 3. Therefore, these steps are not repeatedly described herein. For example, in the embodiment of the disclosure, after the processor 110 obtains the at least three target scanning spots corresponding to the calibration board 140 having a first posture (in step S307), the processor 110 obtains another posture (i.e., a second posture) of the calibration board 140 in step S601 and determines whether a posture count value is greater than or equal to a target value. For example, in the embodiment, assuming that the target value is 30 and the posture count value corresponding to the calibration board 140 having the first posture is 1, the processor 110 determines that the posture count value is less than the target value and counts the posture count value in step S603. That is, the current posture count value is incremented by 1 to be 2, and step S301 is performed again on the obtained calibration board 140 having the second posture. That is, in the embodiment, since the target value is 30, the processor 110 collects posture information of at least 30 calibration boards with different postures and uses it as an object to perform the calibration method of the disclosure. Note that the disclosure does not limit the target value. For example, in another embodiment, the target value may be set to be greater than 30 or less than 30, and the target value may also be set according to the accuracy of the calibration result and actual needs. For example, in an embodiment, the more postures of the calibration boards, the smaller the error value of the extrinsic parameters to be obtained. Alternatively, in another embodiment, the target value may also be set according to the calibration system 100 for calibrating a visual coordinate system and a depth coordinate system in different scenes.

Furthermore, when the processor 110 determines that the posture count value is greater than or equal to the target value in step S601, the processor 110 solves the transformation of coordinate systems with a plurality of target scanning spots corresponding to postures in the quantity of the target value in step S605. For example, in the aforementioned embodiment, the processor 110 solves the transformation of coordinate systems with a plurality of target scanning spots corresponding to 30 postures. Specifically, the processor 110 obtains the transformation of coordinate systems between the vision sensor 120 and the depth sensor 130 according to the four endpoints (i.e., the coordinate W1[0,0,0], the coordinate W2[0,h,0], the coordinate W3[w,h,0], and the coordinate W4[w,0,0]) in the first coordinate group, the first transformation $\pi_i^{W \to C}$, and the target scanning spots Pi(j) corresponding to the i postures (e.g., i=30). For example, in the embodiment of the disclosure, the Levenberg-Marquardt algorithm is applied to provide a nonlinear optimized numerical solution to obtain a correspondence $(\pi^{C \to D})^*$, a rotation angle $r^*=(r_\alpha^*, r_\beta^*, r_\gamma^*)$, and a translation $t^*=(t_x^*, t_y^*, t_z^*)$ from the coordinate system of the vision sensor 120 to the coordinate system of the depth sensor 130. The non-linear formula of the obtained correspondence $(\pi^{C \to D})^*$ is shown in the following Formula (5).

$$(\pi^{C \to D})^* = \arg\min_{\pi^{C \to D} \cdot \pi_i^{W \to C}} \Sigma_i \Sigma_j^{Ni} \text{Cover}(\pi^{C \to D} \cdot \pi_i^{W \to C} \cdot W1,$$
$$\pi^{C \to D} \cdot \pi_i^{W \to C} \cdot W2, \pi^{C \to D} \cdot \pi_i^{W \to C} \cdot W3,$$
$$\pi^{C \to D} \cdot \pi_i^{W \to C} \cdot W4, Pi(j)) \quad \text{Formula (5)}$$

Note that in another embodiment of the disclosure, the processor 110 is capable of further transforming the rotation angle $r^*=(r_\alpha^*, r_\beta^*, r_\gamma^*)$ to a rotation matrix R* according to Rodrigues' rotation formula, and thereby the correspondence Formula (6) of the transformation from the coordinate system of the depth sensor 130 to the coordinate system of the vision sensor 120 is further obtained according to the rotation matrix R*.

$$(\pi^{D \to C})^* = \begin{bmatrix} R^{*T} & -R^{*T}t \\ 0^T & 1 \end{bmatrix} \quad \text{Formula (6)}$$

Based on the above, the calibration system for calibrating a visual coordinate system and a depth coordinate system, the calibration method, and the calibration device of the disclosure do not limit the type of depth sensors or the type of calibrated objects used. In addition, by using a common flat plate as the calibration board, the coordinates of the four endpoints of the calibration board are transformed between the world coordinate system, the two-dimensional and three-dimensional coordinate systems of the vision sensor, and the coordinate system of the depth sensor to obtain the calibration results of the transformation of the coordinate systems (i.e., the extrinsic parameters) between the vision sensor and the depth sensor. Accordingly, the calibration method for obtaining the extrinsic parameters is more flexible, and may be widely used in depth sensors, such as a single-line laser radar, a multi-line laser radar, a dynamic laser point, an area depth image, and the like. As a result, the disclosure effectively improves the performance of the calibration process, the utility of the calibration method, and the stability of the calibration results. In addition, the calibration method of the disclosure can ensure that the obtained scanning spots of the depth sensor fall within the four endpoints of the calibration board through the constraining area. Therefore, the accuracy of the calibration results is improved by obtaining the extrinsic parameter with target scanning spots that fall within the four endpoints of the calibration board. Also, errors of the calibration results are reduced with the method of the disclosure for calibrating a plurality of calibration boards with different postures as calibration objects. Accordingly, it is possible to ensure the calibration quality of the extrinsic parameter in a calibration system for calibrating a visual coordinate system and a depth coordinate system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A calibration method for obtaining a transformation of coordinate systems between a vision sensor and a depth sensor, wherein the calibration method comprises:
   (a) creating a first coordinate group of four endpoints of a calibration board in a world coordinate system;
   (b) obtaining an image of the calibration board by the vision sensor and creating a second coordinate group of the four endpoints of the calibration board in a two-dimensional coordinate system;
   (c) creating a third coordinate group of the four endpoints of the calibration board corresponding to the vision sensor in a three-dimensional coordinate system according to the first coordinate group and the second coordinate group; and
   (d) transforming the third coordinate group to a fourth coordinate group corresponding to the depth sensor to obtain the transformation of coordinate systems according to at least three target scanning spots generated by the depth sensor.

2. The calibration method according to claim 1, wherein after the step of creating the second coordinate group of the four endpoints of the calibration board in the two-dimensional coordinate system, the calibration method further comprises:
   obtaining a first transformation between the first coordinate group and the second coordinate group according to a geometric correspondence between the first coordinate group and the second coordinate group and an intrinsic parameter of the vision sensor, wherein the step of creating the third coordinate group of the four endpoints of the calibration board in the three-dimensional coordinate system according to the first coordinate group and the second coordinate group comprises:

transforming the first coordinate group to the third coordinate group according to the first transformation.

3. The calibration method according to claim 1, wherein the step of transforming the third coordinate group to the fourth coordinate group corresponding to the depth sensor comprises:

transforming the third coordinate group to the fourth coordinate group according to a second transformation, wherein the second transformation is a correspondence between a coordinate system of the vision sensor and a coordinate system of the depth sensor.

4. The calibration method according to claim 3, wherein the at least three target scanning spots are located in a quadrilateral formed by the four endpoints in the fourth coordinate group.

5. The calibration method according to claim 4, wherein the step of transforming the third coordinate group to the fourth coordinate group corresponding to the depth sensor to obtain the transformation of coordinate systems according to the at least three target scanning spots generated by the depth sensor comprises:

calculating a sum of areas of four triangles formed by scanning spots generated by the depth sensor and the four endpoints in the fourth coordinate group; and solving the second transformation by taking, as the target scanning spots, scanning spots of which a difference between the sum of the areas of the four triangles and an area of the quadrilateral is less than an error value.

6. The calibration method according to claim 2, wherein the calibration board is a flat plate, a posture of the calibration board is within a visible range of the vision sensor and the depth sensor, and the calibration method further comprises:

(e) obtaining another posture of the calibration board and determining whether a posture count value is greater than or equal to a target value, wherein if the posture count value is greater than or equal to the target value, step (f) is performed, and if the posture count value is less than the target value, the posture count value is counted, and step (a) is re-performed on the calibration board with the another posture; and (f) solving the transformation of coordinate systems with a plurality of target scanning spots corresponding to postures in a quantity of the target value.

7. The calibration method according to claim 6, wherein the transformation of coordinate systems comprises a correspondence, a rotation angle, and a translation between a coordinate system of the vision sensor and a coordinate system of the depth sensor.

8. A calibration system for calibrating a visual coordinate system and a depth coordinate system, comprising:

a vision sensor configured to obtain an image of a calibration board;

a depth sensor configured to generate a plurality of scanning spots; and a processor coupled to the vision sensor and the depth sensor to obtain a transformation of coordinate systems between the vision sensor and the depth sensor, wherein the processor is configured to:

(a) create a first coordinate group of four endpoints of the calibration board in a world coordinate system;

(b) create a second coordinate group of the four endpoints of the calibration board in a two-dimensional coordinate system according to the image of the calibration board;

(c) create a third coordinate group of the four endpoints of the calibration board corresponding to the vision sensor in a three-dimensional coordinate system according to the first coordinate group and the second coordinate group; and (d) transform the third coordinate group to a fourth coordinate group corresponding to the depth sensor to obtain the transformation of coordinate systems according to at least three target scanning spots.

9. The calibration system for calibrating the visual coordinate system and the depth coordinate system according to claim 8, wherein after the operation of creating the second coordinate group of the four endpoints of the calibration board in the two-dimensional coordinate system, the processor is configured to:

obtain a first transformation between the first coordinate group and the second coordinate group according to a geometric correspondence between the first coordinate group and the second coordinate group and an intrinsic parameter of the vision sensor, wherein in the operation of creating the third coordinate group of the four endpoints of the calibration board in the three-dimensional coordinate system according to the first coordinate group and the second coordinate group, the processor is configured to:

transform the first coordinate group to the third coordinate group according to the first transformation.

10. The calibration system for calibrating the visual coordinate system and the depth coordinate system according to claim 8, wherein in the operation of transforming the third coordinate group to the fourth coordinate group corresponding to the depth sensor, the processor is configured to:

transform the third coordinate group to the fourth coordinate group according to a second transformation, wherein the second transformation is a correspondence between a coordinate system of the vision sensor and a coordinate system of the depth sensor.

11. The calibration system for calibrating the visual coordinate system and the depth coordinate system according to claim 10, wherein the at least three target scanning spots are located in a quadrilateral formed by the four endpoints in the fourth coordinate group.

12. The calibration system for calibrating the visual coordinate system and the depth coordinate system according to claim 11, wherein in the operation of transforming the third coordinate group to the fourth coordinate group corresponding to the depth sensor to obtain the transformation of coordinate systems according to the at least three target scanning spots generated by the depth senor on the calibration board, the processor is configured to:

calculate a sum of areas of four triangles formed by the scanning spots and the four endpoints in the fourth coordinate group; and solve the second transformation by taking, as the target scanning spots, scanning spots of which a difference between the sum of the areas of the four triangles and an area of the quadrilateral is less than an error value.

13. The calibration system for calibrating the visual coordinate system and the depth coordinate system according to claim 9, wherein the calibration board is a flat plate, and a posture of the calibration board is within a visible range of the vision sensor and the depth sensor, wherein the processor is further configured to:
(e) obtain another posture of the calibration board and determine whether a posture count value is greater than or equal to a target value, wherein if the posture count value is greater than or equal to the target value, operation (f) is performed, and if the posture count value is less than the target value, the posture count value is counted, and operation (a) is re-performed on the calibration board with the another posture; and
(f) solve the transformation of coordinate systems with a plurality of target scanning spots corresponding to postures in a quantity of the target value.

14. The calibration system for calibrating the visual coordinate system and the depth coordinate system according to claim 13, wherein the transformation of coordinate systems comprises a correspondence, a rotation angle, and a translation between a coordinate system of the vision sensor and a coordinate system of the depth sensor.

15. A calibration device, comprising
a storage circuit storing images of a calibration board obtained by a vision sensor and storing a plurality of scanning spots generated by a depth sensor on the calibration board; and
a processor coupled to the storage circuit and accessing the images and the scanning spots to:
(a) create a first coordinate group of four endpoints of the calibration board in a world coordinate system;
(b) create a second coordinate group of the four endpoints of the calibration board in a two-dimensional coordinate systems according to the images of the calibration board;
(c) create a third coordinate group of the four endpoints of the calibration board corresponding to the vision sensor in a three-dimensional coordinate system according to the first coordinate group and the second coordinate group; and
(d) transform the third coordinate group to a fourth coordinate group corresponding to a depth sensor to obtain a transformation of coordinate systems according to at least three target scanning spots.

16. The calibration device according to claim 15, wherein after the operation of creating the second coordinate group of the four endpoints of the calibration board in the two-dimensional coordinate system, the processor is configured to:
obtain a first transformation between the first coordinate group and the second coordinate group according to a geometric correspondence between the first coordinate group and the second coordinate group and an intrinsic parameter of the vision sensor,
wherein in the operation of creating the third coordinate group of the four endpoints of the calibration board in the three-dimensional coordinate system according to the first coordinate group and the second coordinate group, the processor is configured to:
transform the first coordinate group to the third coordinate group according to the first transformation.

17. The calibration device according to claim 15, wherein in the operation of transforming the third coordinate group to the fourth coordinate group corresponding to the depth sensor, the processor is configured to:
transform the third coordinate group to the fourth coordinate group according to a second transformation, wherein the second transformation is a correspondence between a coordinate system of the vision sensor and a coordinate system of the depth sensor.

18. The calibration device according to claim 17, wherein the at least three target scanning spots are located in a quadrilateral formed by the four endpoints in the fourth coordinate group.

19. The calibration device according to claim 18, wherein in the operation of transforming the third coordinate group to the fourth coordinate group corresponding to the depth sensor to obtain the transformation of coordinate systems according to the at least three target scanning spots generated by the depth sensor on the calibration board, the processor is configured to:
calculate a sum of areas of four triangles formed by the scanning spots and the four endpoints in the fourth coordinate group; and
solve the second transformation by taking, as the target scanning spots, scanning spots of which a difference between the sum of the areas of the four triangles and the area of the quadrilateral is less than an error value.

20. The calibration device according to claim 16, wherein the calibration board is a flat plate, and a posture of the calibration board is within a visible range of the vision sensor and the depth sensor,
wherein the processor is further configured to:
(e) obtain another posture of the calibration board and determine whether a posture count value is greater than or equal to a target value, wherein if the posture count value is greater than or equal to the target value, operation (f) is performed, and if the posture count value is less than the target value, the posture count value is counted, and operation (a) is re-performed on the calibration board with the another posture; and
(f) solve the transformation of coordinate systems with a plurality of target scanning spots corresponding to postures in a quantity of the target value.

21. The calibration device according to claim 20, wherein the transformation of coordinate systems comprises a correspondence, a rotation angle, and a translation between a coordinate system of the vision sensor and a coordinate system of the depth sensor.

* * * * *